United States Patent Office 3,631,035
Patented Dec. 28, 1971

3,631,035
2-VINYL-1,4-DIHYDROQUINAZOLINE DERIVATIVES
David A. Cox, Sandwich, Kent, England, assignor to
Pfizer Inc., New York, N.Y.
No Drawing. Filed Apr. 2, 1969, Ser. No. 812,910
Int. Cl. C07d 51/48
U.S. Cl. 260—240 D           10 Claims

ABSTRACT OF THE DISCLOSURE

A series of novel 1,4-disubstituted-2-vinyl-1,4-dihydroquinazoline derivatives, including their pharmaceutically acceptable acid addition salts, have been prepared using various alternate synthetic routes. These compounds are useful in the effective control and/or prevention of thrombosis. Trans-1,4-dimethyl-2-styryl-1,4-dihydroquinazoline and trans - 1 - methyl-2-styryl-4-phenyl-1,4-dihydroquinazoline are preferred embodiments.

BACKGROUND OF THE INVENTION

This invention relates to certain new and useful 2-vinyl-1,4-dihydroquinazoline derivatives. More particularly, it is concerned with various novel 1,4-disubstituted-2-vinyl-1,4-dihydroquinazolines and their acid addition salts, which are of especial value in view of their outstanding anti-thrombotic properties.

In the past, various attempts have been made by numerous investigators in this particular field of therapy to obtain new and improved agents for the treatment of thrombosis, i.e., the condition that is primarily caused by the adherence of separate blood platelets in the blood stream to the endothelium of damaged blood vessels, whereby so-called platelet thrombi are formed. In some instances, these efforts have even involved the synthesis and testing of various compounds having the 2-vinyl-1,4-dihydroquinazoline type structure. For instance, Belgian Pat. No. 695,287, granted Sept. 11, 1967, discloses various 1-substituted 2-vinyl-1,4-dihydroquinazolines, such as trans-1-methyl-2-styryl-1,4-dihydroquinazoline, that are reported to be useful for hypotensive purposes. These compounds were also found to be useful as anti-thrombotic agents, but unlike the 1,4-disubstituted compounds of the present invention, they proved to be somewhat more toxic in nature when used for the particular purposes at hand.

SUMMARY OF THE INVENTION

In accordance with the present invention, it has now been found that various novel 1,4-disubstituted-2-vinyl-1,4-dihydroquinazolines are extremely useful when employed in the field of drug therapy as anti-thrombotic-agents. The novel compounds of this invention are all selected from the group consisting of 2-vinyl-1,4-dihydroquinazoline bases of the formula:

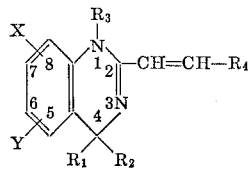

and the pharmaceutically acceptable acid addition salts thereof, wherein X and Y are each a member selected from the group consisting of hydrogen, fluorine, chlorine, bromine, nitro-trifluoromethyl, and alkyl and alkoxy each having up to four carbon atoms; $R_1$ and $R_3$ are each a member selected from the group consisting of alkyl having from one to six carbon atoms, phenylalkyl having up to three carbon atoms in the alkyl moiety, phenyl, fluorophenyl, chlorophenyl, bromophenyl, nitrophenyl, trifluoromethylphenyl, tolyl and anisyl; $R_2$ is a member selected from the group consisting of hydrogen and alkyl having from one to six carbon atoms, said $R_2$ being alkyl only when $R_1$ is other than alkyl or phenylalkyl; and $R_4$ is a member selected from the group consisting of phenyl, fluorophenyl, chlorophenyl, bromophenyl, nitrophenyl, trifluoromethylphenyl, tolyl, anisyl, naphthyl, pyridyl, quinolinyl, furyl, thienyl, 2-imidazolyl and 2-thiazolyl. These compounds all possess anti-thrombotic activity and are therefore useful in the treatment of thrombosis and/or for the control of thrombotic conditions, including the prevention of same.

Typical member compounds of this invention include such 1,4-disubstituted-2-vinyl-1,4-dihydroquinazolines, as trans-1,4-dimethyl-2-styryl-1,4-dihydroquinazoline,
trans-1,4-dimethyl-2-styryl-6-chloro-1,4-dihydroquinazoline,
trans-1,4-dimethyl-2-(p-nitrostyryl)-1,4-dihydroquinazoline,
trans-1-methyl-2-styryl-4-phenyl-1,4-dihydroquinazoline,
trans-1-methyl-2-[2-(2-pyridyl)vinyl]-4-phenyl-1,4-dihydroquinazoline,
trans-1-methyl-2-[2-(3-pyridyl)vinyl]-4-phenyl-1,4-dihydroquinazoline,
trans-1-methyl-2-[2-(4-pyridyl)vinyl]-4-phenyl-1,4-dihydroquinazoline and
trans-1-methyl-2-[2-(2-thienyl)vinyl]-4-phenyl-1,4-dihydroquinazoline.

These particular compounds are all highly potent as regards their anti-thrombotic activity, in addition to being far less toxic than the aforementioned compounds in the Belgian patent.

DETAILED DESCRIPTION OF THE INVENTION

In accordance with the process employed for preparing the novel compounds of this invention, various alternate methods are provided depending upon the actual starting materials and/or intermediate utilized in this connection. For instance, compounds of the invention wherein $R_2$ is hydrogen, i.e., 1,4-disubstituted-2-vinyl-1,4-dihydroquinazolines, per se, may be prepared by simply condensing the corresponding 2-methyl-1,4-dihydroquinazoline with the appropriate aldehyde of formula $R_4CHO$. On the other hand, these same compounds may also be prepared by reacting an appropriately substituted 2 - alkylamino-α-alkylbenzylamine with either (1) a nitrile of the formula $R_4$—CH=CH—CN, or with (2) an acylating derivative of an acid of the formula $R_4$—CH=CH—COOH, followed by cyclization in the presence of a dehydrating agent. Compounds of the invention where $R_2$ is alkyl, i.e., 1,4,4 - trisubstituted - 2-vinyl-1,4-dihydroquinazolines, are then prepared direct from the aforementioned 1,4-disubstituted - 2 - vinyl-1,4-dihydroquinazolines by means of simple alkylation in a conventional manner.

In accordance with a more detailed consideration of the various processes employed for preparing the novel compounds of this invention, the reaction between the appropriate 2-alkyl-amino-α-alkylbenzylamine and nitrile of the formula R$_4$—CH=CHCN is carried out in a suitable reaction-inert polar organic solvent, such as a lower alkanol like ethanol, at a temperature that is in the range of from about 20° C. up to about 200° C. for a period of from about one to 24 hours. Upon completion of the reaction, the solvent (if any) is removed by such standard means as evaporation under reduced pressure or else by steam distillation to give a residue that is subsequently dissolved in dilute acid, basified to liberate free base and thereafter converted to the desired non-toxic acid addition salt by using a dilute aqueous solution of said acid in order to crystallize same. Needless to say, the aforesaid overall reaction can be repeated using other agents in place of the nitrile, e.g., any compound which reacts as a nitrile can be used, like alkyl imidate and thioimidate salts of the formula R$_4$—CH=CH—C(ZR$_5$)=NH$_2$+A⁻, where Z is oxygen or sulfur, R$_5$ is lower alkyl and A⁻ represents an inorganic anion; or the alkane sultone derivatives of unsaturated amides having the formula $$R_4—CH=CH—C(OR_6SO_3)=NH_2^+$$

with R$_6$ being a lower alkylene moiety.

The reaction between the aforementioned appropriately substituted 2-aminobenzylamine and the acylating derivative of an acid of the formula R$_4$—CH—CH—COOH, followed by cyclization, can be best carried out by using the acid chloride derivative of said compound or, and still more preferably, by using a mixed carbonic anhydride of the acid and then dehydrating (and cyclizing) in the presence of polyphosphoric acid or a suitable ester thereof. The mixed carbonic anhydride employed in this manner is obtained by reacting the corresponding acid with a lower alkyl chloroformate at a temperature below about 15° C. in the presence of a suitable base. In the case of either reagent (i.e., acid chloride or mixed carbonic anhydride), the acylation step leading ultimately to the aforementioned final product is accomplished in a most facile manner by also carrying out the reaction in a suitable reaction-inert organic solvent, such as an aromatic hydrocarbon solvent like benzene, toluene, xylene and so forth, with the subsequent dehydration step being effected preferably at an elevated temperature, e.g., a temperature in the approximate range of 130–135° C.

The aforementioned 2-aminobenxylamines, e.g., 2-alkyl-amine-α-alkyl-benzylamines or 2-arylamino-α-arylbenzylamines, etc., required as starting materials for either of the previously described ring-formation reactions, can be obtained by simply acrylating the corresponding 2-aminophenyl ketoximes to yield bis-acyl intermediates, which are then subsequently reduced to the desired compound by means of a reagent such as diborane. These same starting materials may also be prepared by an alternate route involving the use of the appropriate 2-aminophenyl ketoximes and their direct reduction, with Raney nickel and hydrogen, to afford the desired compounds in a one-step approach, thereby avoiding the necessity of any intervening intermediates.

Again, the compounds of the invention wherein R$_2$ is hydrogen may be prepared by simply condensing the corresponding 2-methyl-1,4-dihydroquinazolines with an aldehyde of the formula R$_4$CHO. The condensation reaction is generally effected in a suitable reaction-inert organic solvent (preferably an aromatic hydrocarbon solvent) like toluene, etc., and at a temperature that is in the range of from about 30° C. up to about 200° C. for a period of about one to about 48 hours. In practice, it is usually found most convenient to conduct the reaction at the boiling point of the solvent used (i.e., the reflux temperature of the reaction mixture), using a Dean and Stark trap to remove the water formed during the course of the reaction. A weak base, such as a secondary amine like piperidine, may also be used as catalyst for the reaction. In any event, the desired resulting product, viz., 1,4-disubstituted-2-vinyl-1,4-dihydroquinazoline, is subsequently isolated from the reaction mixture by such means as first removing the solvent and liquid catalyst therefrom, preferable via evaporation under reduced pressure, and then converting the free organic base to a pharmaceutically acid addition salt by dissolving same in a suitable solvent containing the requisite amount of acid needed to precipitate the salt.

The starting materials required for the condensation reaction of this invention, viz., the 2-methyl-1,4-dihydroquinazolines, may be prepared from the aforementioned 2-aminobenzylamines by simply reacting the latter with acetonitrile or with any compound which reacts in a manner similar to acetonitrile, like an alkyl acetimidate or thioacetimidate salt or an alkane sultone derivative of acetamide, for example, to give the desired ring compounds in one-step direct. Furthermore, those 4-substituted 2-methyl-1,4-dihydroquinazoline starting materials which lead to final products where R$_1$ is aryl (e.g., phenyl) can be prepared from the corresponding 2-methyl-1,4-dihydroquinazolin-4-ones by means of a Grignard reaction with the appropriate aryl magnesium bromide, followed by reduction of the 4-hydroxy-4-aryl intermediate so formed with phosphorus and hydrogen iodide. Alternatively, the same particular 2-methyl-4-aryl-1,4-dihydroquinazolines may also be prepared by treating the corresponding N-substituted 2-aminophenyl aryl carbinols with acetonitrile, using concentrated sulfuric acid to effect said reaction, followed by subsequent cooling and neutralization with alkali.

As regards compounds of the invention wherein R$_2$ is alkyl, i.e., the 1,4,4-trisubstituted-2-vinyl-1,4-dihydroquinazolines of this invention, preparation is achieved by alkylating the corresponding 1,4-disubstituted-2-vinyl-1,4-dihydroquinazolines previously described, using such conventional means for direct alkylation as reaction with a substantially equimolar amount of an alkyl halide having the requisite number of carbon atoms, wherein the halide moiety is either bromine or iodine. This particular reaction is normally conducted in a reaction-inert polar organic solvent in the presence of a basic condensing agent, such as an alkali metal hydride (e.g., sodium hydride) or an alkali metal lower alkanolate, at a temperature that is in the range of from about 5° C. up to 35° C. Preferred solvents for the reaction include the lower N,N-dialkyl alkanoamides like N,N-dimethylformamide and N,N-dimethylacetamide, etc. The 1,4,4-trisubstituted compounds produced in this manner, like the 1,4-disubstituted compounds from which they are derived, can exist in optically active forms by virtue of the asymmetric carbon atom at the 4-position of the molecule (since R$_1$ and R$_2$ are different). The invention includes the separated d- and l-forms, as well as the racemic mixtures produced by alkylation, well within its scope.

The acids which are used to prepare the pharmaceutically-acceptable acid addition salts of this invention are those which form non-toxic acid addition salts containing pharmacologically acceptable anions, such as the hydrochloride and sulfate, when reacted with the aforementioned 2-vinyl-1,4-dihydroquinazoline base compounds. Preferred acids for use in this connection include hydrochloric acid, hydrobromic acid, hydroiodic acid, nitric acid, sulfuric acid, phosphoric acid, acetic acid, lactic acid, citric acid, tartaric acid, gluconic acid, saccharaic acid, benzoic acid, succinic acid, maleic acid, fumaric acid methanesulfonic acid, ethanesulfonic acid, benzenesulfonic acid, p-toluene acid, picric acid, amsonic acid (4,4'-diaminostilbene-2,2'-disulfonic acid) and pamoic acid (1,1'-methylene-bis-2-hydroxy-3-naphthoic acid).

As previously indicated, the 2-vinyl-1,4-dihydroquinazoline compounds of this invention are especially valuable as anti-thrombotic agents, particularly in view of their potent action in inhibiting the formation of platelet thrombi as well as their substantial lack of toxicity. For instance, trans-1,4-dimethyl-2-styryl-1,4-dihydroquinazoline and trans-1-methyl-2-styryl-4-phenyl-1,4-dihydroquinazoline, both typical and preferred agents of the present invention, have been tested in vitro for anti-thrombotic activity by measuring their effect in inhibiting the aggregation of rabbit and human blood platelets, induced by either adenosine diphosphate or by collagen [using techniques similar to those described by Born et al. in the Journal of Physiology, vol. 162, p. 67p (1962) and vol. 168, p. 178 (1963)]. Based on these tests, both compounds have been shown to exhibit activity comparable to that of adenosine at the same concentration level (viz., $10^{-4}$ molar). The other compounds of this invention also cause similar results. Further, all the herein described compounds can be administered, as anti-thrombotic agents, by either the oral or parenteral routes of administration without causing any significant untoward side effects. In general, they are ordinarily administered in dosages ranging from about 1.0 mg. to about 100 mg. per kg. of body weight per day, although variations will necessarily occur depending upon the weight and condition of the subject being treated and the particular route of administration chosen.

In connection with the use of the 2-vinyl-1,4-dihydroquinazoline compounds of this invention for the treatment of subjects affiliated with thrombosis, it is to be noted that these compounds may be administered either alone or in combination with pharmaceutically acceptable carriers by either of the two routes previously indicated, and that such administration can be carried out in both single and multiple dosages. More particularly, the novel compounds of this invention can be administered in wide variety of different dosage forms, i.e., they may be combined with various pharmaceutically-acceptable inert carriers in the form of tablets, capsules, lozenges, troches, hard candies, powders, sprays, aqueous suspension, injectable solutions, elixirs, syrups, and the like. Such carriers include solid diluents or fillers, sterile aqueous media and various non-toxic organic solvents, etc. Moreover, such oral pharmaceutical formulations can be suitably sweetened and/or flavored by means of various agents of the type commonly employed for just such purposes. In general, the therapeutically useful compounds of this invention are present in such dosage forms at concentration levels ranging from about 0.5% to about 90% by weight of the total composition, i.e., in amounts which are generally sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additonally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient therein may be combined with various sweetening and flavoring agents, coloring matter or dyes and, if so desired, emulsifying and/or suspending agents as well, together with such diluents as water, ethanol, propylene glycol, glycerin and various like combinations thereof.

For purposes of parenteral administration, solutions of these particular 2-vinyl-1,4-dihydroquinazoline bases in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are readily obtainable by standard techniques well-known to those skilled in the art.

This invention is more explicitly illustrated by the following examples, which are not to be construed in any way or manner as imposing limitations upon the scope thereof. Further, nuclear magnetic resonance evidence for the products of said examples clearly indicates that the 1,4-dihydroquinazoline structure is truly present in each case rather than that of any other dihydro positional isomer, and that the double bond structure present in the vinylene moiety is of the trans configuration rather than the cis.

EXAMPLE I

A mixture consisting of 15.5 g. of 98% formic acid and 34.2 g. of acetic anhydride was heated at 50° C. for a period of two hours. To the cooled mixture, there was then added slowly, and with cooling, a solution of 8.4 g. of 2-aminoacetophenone oxime dissolved in 110 ml. of tetrahydrofuran. Upon completion of this step, the clear solution was allowed to stand at room temperature (~25° C.) for five days and then subsequently concentrated in vacuo to yield a brown residual liquid. Trituration of the latter material with chloroform-petroleum ether (B.P. 100–120° C.) then gave 7.6 g. of O-formyl-2-formylaminoacetophenone oxime in the form of fluffy colorless needles, M.P. 96–97° C.

The bis-formyl compound (5.6 g.) obtained above was then slowly added to 200 ml. of a stirred solution (0.5 M) of diborane in tetrahydrofuran. After stirring the reaction mixture for four hours at room temperature (~25° C.), 80 ml. of 5 N hydrochloric acid were subsequently added and the tetrahydrofuran thereafter removed under pressure. Isolation of the product was then accomplished by means of basification and extraction into chloroform, and subsequent removal of the latter solvent under reduced pressure, to give 3.95 g. of 2-methylamino-α-methylbenzylamine as a pale yellow liquid.

A mixture consisting of 4.5 g. of 2-methylamino-α-methylbenzylamine and the zwitterionic imidate obtained from cinnamide and propane sultone (8.5 g.) was heated in 50 ml. of ethanol at reflux for a period of six hours. The clear solution thus obtained was subsequently concentrated under reduced pressure and the resulting concentrate dissolved in dilute hydrochloric acid, followed by washing with diethyl ether. The saved aqueous portion was then basified with 10% sodium hydroxide and crude material obtained as a semisolid oil (7.6 g.) was thereafter crystallized from dilute aqueous hydrochloric acid to give trans-1,4-dimethyl-2-styryl-1,4-dihydroquinazoline as the hydrochloride salt, M.P. 220–221° C. after one recrystallization from methyl ethyl ketone. The yield of pure product, in the form of pale brown rhombic crystals, amounted to 2.3 grams.

*Analysis.*—Calcd. for $C_{18}H_{18}N_2 \cdot HCl$ (percent): C, 72.33; H, 6.41; N, 9.38. Found (percent): C, 72.06; H, 6.41; N, 9.20.

EXAMPLE II

The procedure described in Example I was repeated using 2-amino-5-chloroacetophenone oxime as the ultimate starting material in place of the corresponding 5-dechloro compound. In this particular case, 2-amino-5-chloroacetophenone oxime was converted to O-formyl-2-formalyamino-5-chloroacetophenone oxime, M.P. 110° C.) which, in turn, gave 2-methylamino-5-chloro-α- methylbenzylamine (B.P. 130–155° C./5.5 mm. Hg) on reduction with diborane. 2-methylamino-5-chloro-α-methylbenzylamine was then converted to trans-1,4-dimethyl-2-styryl-6-chloro-1,4 - dihydroquinazoline in the final step, isolated as the hydrochloride monohydrate, M.P. 228–230° C. after crystallizing from methanol-methyl ethyl ketone in the form of yellow needles.

Analysis.—Calcd. for $C_{18}H_{17}ClN_2 \cdot HCl \cdot H_2O$ (percent): C, 61.55; H, 5.73; N, 7.97. Found (percent): C, 61.60; H, 5.40; N, 7.87.

EXAMPLE III

A mixture of 25 g. of 2-methylaminoacetophenone oxime and 3 g. of Raney nickel in 600 ml. of ethanol was hydrogenated at 1000 p.s.i.g., while at a temperature of 70° C. Upon completion of this step, the catalyst was removed by means of filtration and the ethanolic filtrate concentrated in vacuo to yield 23.5 g. of 2-methylamino-α-methylbenzylamine as a yellow oil. The latter material (21 g.) was dissolved in 250 ml. of benzene and saved for the next step.

To a mixture of 20 g. of cinnamic acid and 14.1 g. of triethylamine dissolved in benzene at 5° C., there were added dropwise with stirring 15 g. of ethyl chloroformate. Upon completion of this step, the reaction solution was thereafter stirred for a further 30 minutes, while keeping the temperature below 15° C. and the resulting triethylamine hydrochloride was then removed from the mixture by means of filtration. The filtrate thus obtained was then added to the benzene solution of 2-methylamino-α-methylbenzylamine, obtained as described above, and the resulting mixture stirred for one hour while at room temperature (~25° C.). After refluxing the latter reaction mixture for a period of one-half hour, the cooled benzene solution soon deposited colorless needles of N-(2-methylamino-α-methylbenzyl)cinnamide, M.P. 173–175° C. The yield of product amounted to 12 g. and trituration of the concentrated mother liquors with diethyl ether afforded a further 4 g. of the same material.

A mixture consisting of 20 g. of N-(2-methylamino-α-methylbenzyl)cinnamide, prepared as described above, and 300 g. of polyphosphate ester formed by refluxing a chloroform solution containing phosphoric oxide and diethyl ether (and thereafter removing the solvent in vacuo) was heated to 130° C., over a period of 15 minutes and thereafter maintained at 130–135° C. for an additional 30 minutes. At the end of this time, the clear orange yellow solution was poured unto 500 ml. of ice water and the resulting aqueous solution made alkaline with 10% sodium hydroxide. The basified solution was then extracted with diethyl ether and the ethereal extract subsequently dried over anhydrous magnesium sulfate and filtered. Upon concentration of the ether extract under reduced pressure, there was obtained a yellow oil as residue and this, in turn, was then triturated with 2 N hydrochloric acid (250 ml.) to yield 20.5 g. of trans-1,4-dimethyl - 2 - styryl-1,4-dihydroquinazoline hydrochloride, identical with the product of Example I.

EXAMPLE IV

A mixture of 3.95 g. of 2-methylamino-α-methylbenzylamine and 3.4 g. of ethyl acetimidate hydrochloride was refluxed in 50 ml. of absolute ethanol for a period of five hours. The ammonium chloride which formed was then removed by means of filtration and the filtrate subsequently evaporated under reduced pressure to give 3.8 g. of 1,2,4-trimethyl-1,4-dihydroquinazoline as a yellow oil. The latter material was subsequently converted to the orange-colored hydrochloride salt, via 2 N hydrochloric acid, to afford pure 1,2,4-trimethyl-1,4-dihydroquinazoline hydrochloride, M.P. 244–246° C. after recrystallization from isopropanol-ethyl acetate.

Analysis. — Calcd. for $C_{11}H_{14}N_2 \cdot HCl$ (percent): C, 62.70; H, 7.18; N, 13.30. Found (percent): C, 62.38; H, 7.18; N, 12.98.

A solution consisting of 1.74 g. of 1,2,4-trimethyl-1,4-dihydroquinazoline as free base and 1.51 g. of p-nitrobenzaldehyde in 65 ml. of dry toluene, also containing 0.3 ml. of piperidine, was heated at reflux for a period of 20 hours, using a Dean and Stark trap to collect the water which formed during the course of the reaction. The resulting dark brown solution was then concentrated in vacuo, and the residual oil was subsequently extracted with diethyl ether. Treatment of the ethereal extract with an ethereal solution of dry hydrogen chloride gas then gave trans-1,4-dimethyl-2-(p-nitrostyryl)-1,4-dihydroquinazoline hydrochloride in the form of a light brown solid (1.0 g.), M.P. 235–237° C. after crystallizing from methyl ethyl ketone-methanol as yellow needles.

Analysis. — Calcd. for $C_{18}H_{17}N_3O_2 \cdot HCl$ (percent): C, 62.88; H, 5.28; N, 12.22. Found (percent): C, 62.99; H, 5.25; N, 12.00.

EXAMPLE V

A mixture of 50 g. of 2-methylaminodiphenyl carbinol and 60 g. of acetonitrile was stirred together, while 15 ml. of concentrated sulfuric acid was slowly being added thereto in a dropwise manner. The maximum temperature attained during the course of the exothermic reaction was 70° C. Upon completion of this step, the temperature of the mixture was maintained at 70° C. for a further one-half hour and then allowed to cool slowly to ambient room temperature by standing for a period of approximately 16 hours (i.e., overnight). The cooled solution was then poured into ice water (300 ml.) and subsequently made alkaline with solid sodium carbonate, followed by extraction with diethyl ether. The yellow oil obtained by concentration of the ether extract under reduced pressure was then treated with dilute hydroiodic acid solution (ca. 27%), and the pale yellow solid which formed at this point was subsequently filtered and washed with methyl ethyl ketone. In this manner, there was obtained a 60 g. yield of 1,2-dimethyl-4-phenyl-1,4-dihydroquinazoline hydroiodide, M.P. 288–290° C. after crystallizing from isopropanol-methanol in the form of colorless needles.

Analysis. — Calcd. for $C_{16}H_{16}H_2 \cdot HI$ (percent): C, 52.75; H, 4.70; N, 7.69. Found (percent): C, 53.31; H, 4.66; N, 7.99.

A solution of 1,2-dimethyl-4-phenyl-1,4-dihydroquinazoline obtained from 25 g. of the hydriodide (via treatment with 10% aqueous sodium carbonate) and 8 g. of benzaldehyde in 100 ml. of dry toluene was refluxed for a period of three hours, using a Dean and Stark trap to collect the water which formed during the course of the reaction. The resulting solution was then cooled slowly to room temperature (~25° C.) and ethereal hydrogen chloride was added dropwise thereto with stirring. The solid precipitate obtained in this manner was subsequently collected by means of suction filtration to afford 1-methyl-2-styryl-4-phenyl-1,4-dihydroquinazoline hydrochloride as an off-white solid, M.P. 265–268° C. after crystallization from methanol-acetone.

Analysis. — Calcd. for $C_{23}H_{20}N_2 \cdot HCl$ (percent): C, 76.60; H, 5.87; N, 7.77. Found (percent): C, 76.30; H, 6.06; N, 7.82.

EXAMPLE VI

The procedure described in Example V as repeated except that pyridine-2-aldehyde was the reagent employed instead of benzaldehyde in the second step of said procedure (i.e., in the so-called condensation reaction). In this particular case, using the same molar proportions of reactant and reagent as before, 1,2-dimethyl-4-phenyl-1,4-dihydroquinazoline and pyridine-2-aldehyde reacted to afford trans-1-methyl-2-[2-(2-pyridyl)vinyl]-4-phenyl-1,4-dihydroquinazoline, isolated as the hydrochloride, M.P. 178–181° C.

*Analysis.* — Calcd. for $C_{22}H_{19}N_3 \cdot 1.5HCl$ (percent): C, 69.52; H, 5.40; N, 11.06. Found (percent): C, 69.50; H, 5.58; N, 10.93.

EXAMPLE VII

The procedure described in Example V was repeated except that pyridine-3-aldehyde was the reagent employed instead of benzaldehyde in the second step of said procedure (i.e., in the so-called condensation reaction). In this particular case, using the same molar proportions of reactant and reagent as before, 1,2-dimethyl-4-phenyl-1,4-dihydroquinazoline and pyridine-3-aldehyde reacted to afford trans-1-methyl-2-[2-(3-pyridyl)vinyl]-4-phenyl-1,4-dihydroquinazoline, isolated as the hydrochloride, M.P. 230–234° C.

*Analysis.* — Calcd. for $C_{22}H_{19}N_3 \cdot 2HCl$ (percent): C, 66.32; H, 5.31; N, 10.55. Found (percent): C, 66.02; H, 5.90; N, 10.26.

EXAMPLE VIII

The procedure described in Example V was repeated except that pyridine-4-aldehyde was the reagent employed instead of benzalydehyde in the second step of said procedure (i.e., in the so-called condensation reaction). In this particular case, using the same molar proportions of reactant and reagent as before, 1,2-dimethyl-4-phenyl-1,4-dihydroquinazoline and pyridine-4-aldehyde reacted to afford trans - 1 - methyl - 2 - [2 - (4-pyridyl)vinyl]-4-phenyl-1,4-dihydroquinazoline, isolated as the hydrochloride, M.P. 185–188° C.

*Analysis.*—Calcd. For $C_{22}H_{19}N_3 \cdot 2HCl$ (percent): C, 66.32; H, 5.31; N, 10.55. Found (percent): C, 66.45; H, 5.59; N, 10.24.

EXAMPLE IX

The procedure described in Example V was repeated except that thiophene-2-aldehyde was the reagent employed instead of benzaldehyde in the second step of said procedure (i.e., in the so-called condensation reaction). In this particular case, using the same molar proportions of reactant and reagent as before, 1,2-dimethyl-4-phenyl-1,4-dihydroquinazoline and thiophene-2-aldehyde reacted to afford trans-1-methyl-2-[2-(2-thienyl)vinyl]-4-phenyl-1,4-dihydroquinazoline, isolated as the hydrochloride, M.P. 254–257° C.

*Analysis.*—Calcd. for $C_{21}H_{18}N_2S \cdot HCl$ (percent): C, 68.71; H, 5.17; N, 7.64. Found (percent): C, 68.68; H, 5.16; N, 7.45.

EXAMPLE X

Ten parts by weight of trans-1,4-dimethyl-2-styryl-1,4-dihydroquinazoline hydrochloride in 50 parts by volume of water is neutralized with 10 N aqueous sodium hydroxide solution. Extraction of the resulting aqueous solution with several portions of methylene chloride, followed by separation of the organic layer and its subsequent concentration under reduced pressure then affords pure trans-1,4 - dimethyl - 2 - styryl - 1,4-dihydroquinazoline as a free organic base compound.

In like manner, when any of the other 2-vinyl-1,4-dihydroquinazoline salts of this invention, like trans-1-methyl - 2 - styryl - 4-phenyl-1,4-dihydroquinazoline hydrochloride of Example V, for instance, are each individually subjected to this very same reaction procedure, the corresponding free organic base compound is always the final product thus obtained.

EXAMPLE XI

The following trans - 1,4 - disubstituted-2-vinyl-1,4-dihydroquinazolines are prepared by employing the procedures described in the previous examples, starting from readily available materials in each instance:

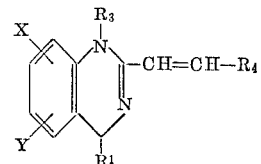

| X | Y | $R_1$ | $R_3$ | $R_4$ |
|---|---|---|---|---|
| H | H | $C_2H_5$ | $C_6H_5$ | $p-CH_3C_6H_4$ |
| H | 5-F | $iso-C_4H_9$ | $CH_3$ | $o-CH_3OC_6H_4$ |
| H | 6-Cl | $n-C_6H_{13}$ | $C_2H_5$ | $\alpha$-Naphthyl. |
| 7-Br | H | $C_6H_5CH_2$ | $iso-C_3H_7$ | $\beta$-Naphthyl. |
| 8-$NO_2$ | H | $C_6H_5(CH_2)_3$ | $n-C_4H_9$ | 2-pyridyl. |
| H | H | $iso-C_3H_7$ | $n-C_6H_{13}$ | 3-pyridyl. |
| H | 6-$CH_3$ | $C_6H_5$ | $C_6H_5CH_2$ | 4-pyridyl. |
| 7-$OCH_3$ | H | $o-FC_6H_4$ | $C_6H_5(CH_2)_2$ | 2-quinolinyl. |
| H | H | $p-ClC_6H_4$ | $C_6H_5(CH_2)_3$ | 3-quinolinyl. |
| 6-Cl | 7-Cl | $m-BrC_6H_4$ | $C_6H_5$ | 4-quinolinyl. |
| H | 6-F | $p-NO_2C_6H_4$ | $o-FC_6H_4$ | 2-furyl. |
| 7-Cl | H | $m-CF_3C_6H_4$ | $p-ClC_6H_4$ | 3-furyl. |
| 8-Br | H | $p-CH_3C_6H_4$ | $m-BrC_6H_4$ | 2-thienyl. |
| H | 5-$NO_2$ | $o-CH_3OC_6H_4$ | $p-NO_2C_6H_4$ | 3-thienyl. |
| H | 6-$CF_3$ | $CH_3$ | $o-CF_3C_6H_4$ | 2-imidazolyl. |
| 7-$C_2H_5$ | H | $C_2H_5$ | $m-CH_3C_6H_4$ | 2-thiazolyl. |
| 8-$OC_2H_5$ | H | $n-C_4H_9$ | $p-CH_3OC_6H_4$ | $C_6H_5$ |
| H | H | $iso-C_5H_{11}$ | $C_2H_5$ | $o-FC_6H_4$ |
| 6-Br | 7-Br | $C_6H_5(CH_2)_2$ | $n-C_3H_7$ | $p-ClC_6H_4$ |
| 7-F | H | $C_6H_5$ | $tert.-C_4H_9$ | $m-BrC_6H_4$ |
| 8-Cl | H | $m-FC_6H_4$ | $n-C_5H_{11}$ | $p-NO_2C_6H_4$ |
| H | 5-Br | $p-ClC_6H_4$ | $iso-C_6H_{13}$ | $m-CF_3C_6H_4$ |
| H | 6-$NO_2$ | $p-BrC_6H_4$ | $C_6H_5CH_2$ | $o-CH_3C_6H_4$ |
| 7-$CF_3$ | H | $m-NO_2C_6H_4$ | $C_6H_5(CH_2)_2$ | $p-CH_3OC_6H_4$ |
| 8-$(n-C_4H_9)$ | H | $o-CF_3C_6H_4$ | $C_6H_5(CH_2)_3$ | $\alpha$-Naphthyl. |
| H | 5-$OC_3H_7$(iso) | $m-CH_3C_6H_4$ | $iso-C_3H_7$ | $\beta$-Naphthyl. |
| H | H | $p-CH_3OC_6H_4$ | $C_6H_5$ | 2-pyridyl. |
| 6-$CH_3$ | 7-$CH_3$ | $CH_3$ | $p-ClC_6H_4$ | 3-pyridyl. |
| 8-F | H | $C_2H_5$ | $C_2H_5$ | 4-pyridyl. |
| H | 5-Cl | $m-C_3H_7$ | $n-C_3H_7$ | 2-quinolinyl. |
| H | 6-Br | $iso-C_3H_7$ | $n-C_6H_{13}$ | 3-quinolinyl. |
| 7-$NO_2$ | H | $n-C_4H_9$ | $C_6H_5(CH_2)_3$ | 4-quinolinyl. |
| 8-$CF_3$ | H | $tert.-C_4H_9$ | $C_6H_5$ | 2-furyl. |
| H | 5-$(iso-C_3H_7)$ | $iso-C_5H_{11}$ | $m-FC_6H_4$ | 3-furyl. |
| H | 6-$OC_4H_9(n)$ | $n-C_6H_{13}$ | $p-BrC_6H_4$ | 2-thienyl. |
| H | H | $C_6H_5CH_2$ | $m-NO_2C_6H_4$ | 3-thienyl. |
| 6-$OCH_3$ | 7-$OCH_3$ | $C_6H_5(CH_2)_3$ | $o-CH_3OC_6H_4$ | 2-imidazolyl. |
| H | H | $n-C_6H_{13}$ | $n-C_6H_{13}$ | $p-NO_2C_6H_4$ |
| H | H | $C_6H_5$ | $iso-C_5H_{11}$ | $C_6H_5$ |
| H | 7-Cl | $n-C_6H_{13}$ | $C_2H_5$ | 2-pyridyl. |
| H | H | $C_6H_5$ | $n-C_6H_{13}$ | 3-thienyl. |

EXAMPLE XII

To a well-stirred solution consisting of 3.24 g. (0.01 mole) of trans - 1-methyl-2-styryl-4-phenyl-1,4-dihydroquinazoline (prepared as described in Example V) dissolved in 35 ml. of dry N,N-dimethylformamide, there is added 0.46 g. of sodium hydride in the form of a 53% suspension in oil (0.01 mole). An immediate foaming occurs due to the evolution of hydrogen, and the temperature of the mixture is observed to rise to approximately 40° C. After stirring for an additional 15 minutes at room temperature (~25° C.), solution of the hydride in the mixture is essentially complete. A separate solution of 1.42 g. (0.01 mole) of methyl iodide in 10 ml. of dry N,N-dimethylformamide is then prepared and added dropwise to the aforesaid mixture during the course of a twenty-minute period, with constant agitation being maintained throughout the addition step. Upon completion of this step, the resultant reaction mixture is stirred for one more hour at room temperature and then added rapidly to 400 ml. of water at a fast, dropwise rate with vigorous agitation. The white solid material which forms at this point is then collected by means of suction filtration, washed well with water and air dried to constant weight, followed by drying in vacuo over $P_2O_5$ at 25° C. for approximately 16 hours. In this way, there is obtained trans-1,4 - dimethyl - 2-styryl-4-phenyl-1,4-dihydroquinazoline, which is subsequently recrystallized from methanol-acetone to afford pure material.

EXAMPLE XIII

To a well-stirred solution consisting of 3.24 g. (0.01 mole) of trans-1-methyl-2-styryl-4-phenyl - 1,4-dihydroquinazoline and 0.65 g. (0.012 mole) of sodium methoxide dissolved in 10 ml. of N,N-dimethylformamide, there is added dropwise during the course of a twenty-minute period 1.48 g. (0.012 mole) of n-propyl bromide dissolved in 5 ml. of dry N,N-dimethylformamide. Upon completion of this step, the resultant reaction mixture is stirred at room temperature (~25° C.) for an additional five hours and then added rapidly to 400 ml. of ice-water at a fast dropwise rate with vigorous agitation being maintained throughout said addition. The white solid precipitate which forms at this point is then collected by means of suction filtration, washed well with cold water and subsequently dried in vacuo over $P_2O_5$ at 25° C. for approximately 16 hours. In this manner, there is obtained trans - 1 - methyl-2-styryl-4-phenyl-4-(n-propyl)-1,4-dihydroquinazoline, which is subsequently recrystallized from methanol-acetone to afford pure material.

EXAMPLE XIV

The following trans-1,4,4-trisubstituted - 2-vinyl-1,4-dihydroquinazolines are prepared by employing the procedure described in the preceding two examples, starting from the corresponding 1,4-disubstituted compound of Example XI and the appropriate alkyl halide of choice in each instance:

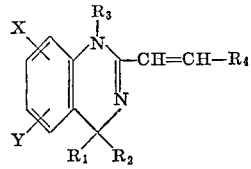

| X | Y | $R_1$ | $R_2$ | $R_3$ | $R_4$ |
|---|---|---|---|---|---|
| H | H | $C_6H_5$ | $C_2H_5$ | $CH_3$ | $C_6H_5$ |
| H | 6-$CH_3$ | $C_6H_5$ | n-$C_6H_{13}$ | $C_6H_5CH_2$ | 4-pyridyl. |
| 7-$OCH_3$ | H | o-$FC_6H_4$ | $CH_3$ | $C_6H_5(CH_2)_2$ | 2-quinolinyl. |
| H | H | p-$ClC_6H_4$ | n-$C_3H_7$ | $C_6H_5(CH_2)_3$ | 3-quinolinyl. |
| 6-Cl | 7-Cl | m-$BrC_6H_4$ | n-$C_4H_9$ | $C_6H_5$ | 4-quinolinyl. |
| H | 6-F | p-$NO_2C_6H_4$ | $C_2H_5$ | o-$FC_6H_4$ | 2-furyl. |
| 7-Cl | H | m-$CF_3C_6H_4$ | iso-$C_5H_{11}$ | p-$ClC_6H_4$ | 3-furyl. |
| 8-Br | H | p-$CH_3C_6H_4$ | $CH_3$ | m-$BrC_6H_4$ | 2-thienyl. |
| H | 5-$NO_2$ | o-$CH_3OC_6H_4$ | n-$C_3H_7$ | p-$NO_2C_6H_4$ | 3-thienyl. |
| H | H | $C_6H_5$ | n-$C_6H_{13}$ | $CH_3$ | $C_6H_5$ |
| 7-F | H | $C_6H_5$ | $C_2H_5$ | tert.-$C_4H_9$ | m-$BrC_6H_4$ |
| 8-Cl | H | m-$FC_6H_4$ | iso-$C_4H_9$ | n-$C_5H_{11}$ | p-$NO_2C_6H_4$ |
| H | 5-Br | p-$ClC_6H_4$ | $CH_3$ | iso-$C_6H_{13}$ | m-$CF_3C_6H_4$ |
| H | 6-$NO_2$ | p-$BrC_6H_4$ | iso-$C_3H_7$ | $C_6H_5CH_2$ | o-$CH_3C_6H_4$ |
| 7-$CF_3$ | H | m-$NO_2C_6H_4$ | $C_2H_5$ | $C_6H_5(CH_2)_2$ | p-$CH_3OC_6H_4$ |
| 8-(n-$C_4H_9$) | H | o-$CF_3C_6H_4$ | n-$C_5H_{11}$ | $C_6H_5(CH_2)_3$ | α-Naphthyl. |
| H | 5-$OC_3H_7$(iso) | m-$CH_3C_6H_4$ | $CH_3$ | iso-$C_3H_7$ | β-Naphthyl. |
| H | H | p-$CH_3OC_6H_4$ | $C_2H_5$ | $C_6H_5$ | 2-pyridyl. |
| H | H | $C_6H_5$ | n-$C_3H_7$ | iso-$C_5H_{11}$ | $C_6H_5$ |
| H | H | $C_6H_5$ | $CH_3$ | n-$C_6H_{13}$ | 3-thienyl. |

EXAMPLE XV

The non-toxic hydrohalide acid addition salts of each of the 2-vinyl - 1,4 - dihydroquinazoline bases reported previously in the preceding examples, viz, the hydrochloride, hydrobromide, and hydriodide salts, are each individually prepared by first dissolving the respective organic base compound in absolute ether followed by the introduction of the appropriate hydrogen halide gas into the reaction solution until saturation of same is complete with respect to said gas, whereupon the desired salt precipitates from said solution. The crystalline products so obtained are then subsequently recrystallized from acetone-diethyl ether to yield the pure hydrohalide salt in each case. For instance, when 1.0 g. of trans- 1,4-dimethyl-2-styryl-1,4-dihydroquinazoline is dissolved in anhydrous diethyl ether and dry hydrogen bromide gas is subsequently passed into the resulting reaction solution until saturation of same in complete with respect to said gas, there is obtained a crystalline precipitate of trans-1,4-dimethyl-2-styryl-1,4 - dihydroquinazoline hydrobromide.

EXAMPLE XVI

The nitrate, sulfate, phosphate, acid phosphate, acetate, lactate, citrate, acid citrate, tartrate, bitartrate, succinate, maleate, fumarate, gluconate, saccharate, gluconate, methanesulfonate, ethanesulfonate, benzenesulfonate and p-toluenesulfonate salt of each of 2-vinyl-1,4-dihydroquinazoline bases previously described in Examples X–XIII of the specification, are all each individually prepared by separately dissolving in a suitable amount of ethanol the proper molar amounts of the respective acid and the appropriate organic base compound and then mixing the two solutions together, followed by the addition of diethyl ether to the resulting reaction solution in order to effect precipitation of the desired acid addition salt therefrom. For instance, when equivalent amounts of trans-1-methyl-2-styryl-4-phenyl - 1,4 - dihydroquinazoline and concentrated sulfuric acid react in accordance with this procedure, the corresponding final product obtained is trans-1-methyl-2-styryl - 4 - phenyl - 1,4-dihydroquinazoline hydrogen sulfate. In like manner, each of the other acid addition salts is similarly obtained.

What is claimed is:

1. A compound selected from the group consisting of 2-vinyl-1,4 - dihydroquinazoline bases of the formula:

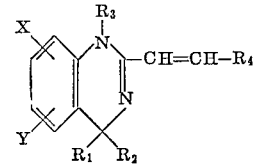

and the pharmaceutically acceptable acid addition salts thereof, wherein X and Y are each a member selected from the group consisting of hydrogen, fluorine, chlorine, bromine, nitro, trifluoromethyl and alkyl and alkoxy each having up to four carbon atoms; $R_1$ is a member selected from the group consisting of phenylalkyl having up to three carbon atoms in the alkyl moiety, phenyl, fluorophenyl, chlorophenyl, bromophenyl, nitrophenyl, trifluoromethylphenyl, tolyl and anisyl; $R_2$ is a member selected from the group consisting of hydrogen and alkyl having from one to six carbon atoms, said $R_2$ being alkyl only when $R_1$ is other than phenylalkyl; $R_3$ is selected from the group defining $R_1$ and alkyl having from one to six carbon atoms and $R_4$ is a member selected from the group consisting of phenyl, fluorophenyl, chlorophenyl, bromophenyl, nitrophenyl, trifluoromethylphenyl, tolyl, anisyl, naphthyl, pyridyl, quinolinyl, furyl, thienyl, 2-imidazolyl and 2-thiazolyl.

2. A compound as claimed in claim 1 wherein $R_1$ is phenyl, $R_2$ is hydrogen and $R_3$ is alkyl of from one to six carbon atoms.

3. A compound as claimed in claim 1 wherein $R_1$ is phenyl, and $R_2$ and $R_3$ are each alkyl of from one to six carbon atoms.

4. A compound as claimed in claim 1 wherein X and Y are each hydrogen, $R_1$ is phenyl, $R_2$ is hydrogen, $R_3$ is alkyl of from one to six carbon atoms and $R_4$ is phenyl.

5. A compound as claimed in claim 1 wherein X and Y are each hydrogen, $R_1$ is phenyl, $R_2$ is hydrogen, $R_3$ is alkyl of from one to six carbon atoms and $R_4$ is pyridyl.

6. A compound as claimed in claim 1 wherein X and Y are each hydrogen, $R_1$ is phenyl, $R_2$ is hydrogen, $R_3$ is alkyl of from one to six carbon atoms and $R_4$ is thienyl.

7. A compound as claimed in claim 1 wherein X and Y are each hydrogen, $R_1$ is phenyl, $R_2$ and $R_3$ are each alkyl of from one to six carbon atoms and $R_4$ is phenyl.

8. A compound as claimed in claim 4 wherein $R_3$ is methyl and the vinylene configuration is trans.

9. A compound as claimed in claim 5 wherein $R_3$ is methyl and the vinylene configuration is trans.

10. A compound as claimed in claim 6 wherein $R_3$ is methyl, $R_4$ is 2-thienyl and the vinylene configuration is trans.

References Cited

UNITED STATES PATENTS 3,519,620   7/1970   Augstein et al. _____ 260—240

G. THOMAS TODD, Primary Examiner

U.S. Cl. X.R.

260—240 A, 240 E; 424—251